(12) United States Patent
Ferrari et al.

(10) Patent No.: US 8,396,366 B2
(45) Date of Patent: Mar. 12, 2013

(54) OPTICAL SAFETY IMPLEMENTATION IN PROTECTION SWITCHING MODULES

(75) Inventors: Cinzia Ferrari, Parma (IT); Alberto Tanzi, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 991 days.

(21) Appl. No.: 12/267,894

(22) Filed: Nov. 10, 2008

(65) Prior Publication Data
US 2010/0119223 A1    May 13, 2010

(51) Int. Cl.
*H04J 4/00* (2006.01)
(52) U.S. Cl. ........ 398/76; 398/27; 398/69; 398/79
(58) Field of Classification Search ........... 398/27, 398/69, 76
See application file for complete search history.

(56) References Cited

U.S. PATENT DOCUMENTS

| | | | | |
|---|---|---|---|---|
| 4,829,512 | A * | 5/1989 | Nakai et al. | 370/224 |
| 6,226,111 | B1 * | 5/2001 | Chang et al. | 398/9 |
| 6,580,530 | B1 * | 6/2003 | Arecco et al. | 398/5 |
| 2002/0145782 | A1 * | 10/2002 | Strasser et al. | 359/127 |
| 2009/0196602 | A1 * | 8/2009 | Saunders et al. | 398/26 |

* cited by examiner

*Primary Examiner* — Armando Rodriguez
*Assistant Examiner* — Sean Hagan

(57) ABSTRACT

Optical safety functions are incorporated into protection switching modules which maintain redundant pathways to avoid interruptions in optical network connections. The optical safety functions which lower optical power levels upon interruptions of optical connections are effectively combined with protection switching procedures which are also triggered by interruptions in optical network connections. The interoperation of protection and safety processes keep optical power levels below hazardous levels at system points which might be accessible to human operators.

21 Claims, 6 Drawing Sheets

US 8,396,366 B2

OPTICAL SAFETY IMPLEMENTATION IN PROTECTION SWITCHING MODULES

BACKGROUND OF THE INVENTION

The present invention is related to optical networks and, more particularly to, safety and protection measures and procedures in such networks.

When a fault occurs in the transmission of signals from a source node to a destination node, such as a break in an optical fiber, the protection measures of the optical network cause the rerouting of the signals to ensure the delivery of optical signals to their destination. There are different ways to protect optical networks against faults. One protection mechanism used in point-to-point links is the 1+1 mechanism in which the source node sends duplicate signals on two separate fibers to the destination node. The destination node receives the optical signals over one fiber, called the working fiber, and switches to the other fiber, called the protection fiber, in case a fault occurs with the first fiber to continue receiving the signals. Another protection mechanism is the 1:1 mechanism (a special case of 1:N protection) in which the source node sends optical signals over the working fiber to the destination node. In case of a fault in the transmission, the source node then switches the transmission of optical signals to the protection fiber. (In the 1:N mechanism there is one protection fiber for N working fibers.)

The sources of these signals for optical networks are lasers. While the lasers used in optical networks have relatively low power compared to, for example, industrial lasers, they are powerful enough to damage the human eye. Therefore safety measures are required for optical networks to avoid injury to human operators and service personnel. A typical safety protocol is OFC (Open Fiber Control) which has measures to detect cuts in optical fiber links, turn off the lasers connected to the link, and then allow low-level laser pulses intermittently on the cut fiber link for the link to be brought back into full operation upon the repair of the cut fiber.

In optical networks modularization of components is highly desirable because of ease of maintenance and repair and these protection and safety measures have been installed in separate modules in accordance with the function of the modules. However, optical networks still have problems in implementing protection and safety measures. The present invention is directed toward the optimum and practical realization of protecting the integrity of network signal delivery and ensuring the safety of human operators.

DETAILED DESCRIPTION OF THE INVENTION

Overview

Figure 1A:
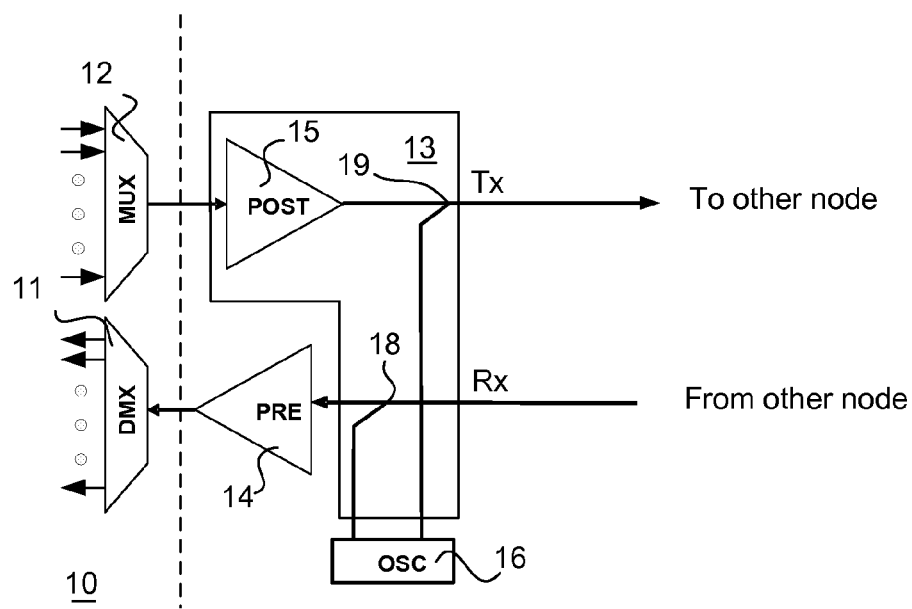
FIG. 1A is a representation of an optical network node with amplifier module.

In an overview of the present invention:

One aspect provides for a method of operating an interface between a network node and an optical fiber link to a remote node at an opposite end of the link. The link has first and second optical fiber loop and each optical fiber loop has a transmitting optical fiber and a receiving optical fiber. The method comprises the steps of: transmitting signals from the node through transmitting optical fibers of both of the first and second optical fiber loops; receiving signals for the node through one of the receiving optical fibers of the first and second optical fiber loops; monitoring receiving optical fibers of both of the first and second optical fiber loops; detecting a fault on one of the receiving optical fibers of the first and second optical fiber loops; switching off a transmitting optical fiber of the optical fiber loop to which the fault-detected receiving optical fiber belongs; maintaining reception of signals for the node through the one of the receiving optical fibers of said first and second optical fiber loops if the fault-detected receiving optical fiber is the other receiving optical fiber of the first and second optical fiber loops, or switching reception of signals for the node through the other receiving optical fiber of the first and second optical fiber loops if the fault-detected receiving optical fiber is the one receiving optical fiber of the first and second optical fiber loops; and maintaining transmission of signals from the node through a transmitting optical fiber of an optical fiber loop to which the fault-detected receiving optical fiber does not belong; whereby the interface performs both protection and safety measures for the network node.

Another aspect provides for an interface between a network node and an optical fiber link to a remote node at an opposite end of the link. The link has a first and second optical fiber loops with each optical fiber loop having a transmitting optical fiber and a receiving optical fiber. The interface comprises: a network node input port for receiving optical signals from the network node; a network node output port for transmitting optical signals to the network node; first and second optical fiber link output ports for sending optical signals from the network node input port to the transmitting optical fibers of the first and second optical fiber loops to the remote node; first and second optical fiber link input ports for receiving optical signals from the receiving optical fibers of the first and second optical fiber loops and passing the optical signals to the network node output port; a plurality of VOAs (Variable Optical Attenuators) controlling the strength of signals on the first and second optical fiber link output ports; and a control unit controlling the plurality of VOAs so that upon detection of a fault on one of the receiving optical fibers of the first and second optical fiber loops, a transmitting optical fiber of the optical fiber loop to which the fault-detected receiving optical fiber belongs is switched off. The interface also has an optical switch connected between the first and second optical fiber link input ports, and the network node output port. The control unit controls the switch so that upon the detection of the fault on the one of the receiving optical fibers of the first and second optical fiber loops, the switch directs optical signals from the other of the receiving optical fibers of the first and second optical fiber loops to the network node output port.

Still another aspect provides for an interface between a network node and an optical fiber link to a remote node at an opposite end of the link, the link having a first and second optical fiber loops and each optical fiber loop having a transmitting optical fiber and a receiving optical fiber. The interface comprises: means for transmitting signals from the node through transmitting optical fibers of both of the first and second optical fiber loops; means for receiving signals for the node through one of the receiving optical fibers of the first and second optical fiber loops; means for monitoring receiving optical fibers of both of the first and second optical fiber loops; means for detecting a fault on one of the receiving optical fibers of the first and second optical fiber loops; means for switching off a transmitting optical fiber of the optical fiber loop to which the fault-detected receiving optical fiber belongs; means for maintaining reception of signals for the node through the one of the receiving optical fibers of the first and second optical fiber loops if the fault-detected receiving optical fiber is the other receiving optical fiber of the first and second optical fiber loops, or switching reception of signals for the node through the other receiving optical fiber of the first and second optical fiber loops if the fault-detected receiving optical fiber is the one receiving optical fiber of the first and second optical fiber loops; and means for maintaining transmission of signals from the node through a transmitting optical fiber of an optical fiber loop to which the fault-detected receiving optical fiber does not belong; whereby the interface performs both protection and safety measures for the network node.

Description of Example Embodiments

FIG. 1A illustrates a node 10 connected to another node (not shown) at the remote end of an exemplary two-fiber link, which forms a fiber loop between the two nodes. The node 10 is represented by a multiplexer 12 which gathers signals from various sources to transmit to the remote node by a Tx fiber and a demultiplexer 11 which separates signals received from the remote node by an Rx fiber for various destinations.

Optical signals deteriorate as they travel through optical networks and must be periodically amplified. To this end optical amplifiers are installed at different locations of an optical network to ensure that optical signals are not lost. In the exemplary and conventional arrangement of FIG. 1A, a pre-amplifier 14 boasts the strength of incoming signals received through the Rx input port over the Rx line before passing the signals to the node 10. For signals leaving the node 10, a post-amplifier 15 boasts signal strength of signals being transmitted through the Tx line port over the Tx line and to the remote node. For ease of maintenance and replacement, the post-amplifier 15 is part of an amplifier module 13 which also provides a splitter 18 on the Rx line and a combiner 19 on the Tx line by which OSC (Optical Supervisory Channel) can be respectively received and sent by a network supervisory and management unit 16. The module 13 provides an interface between the optical fibers of the link to the remote node and the node 10.

Figure 1B:
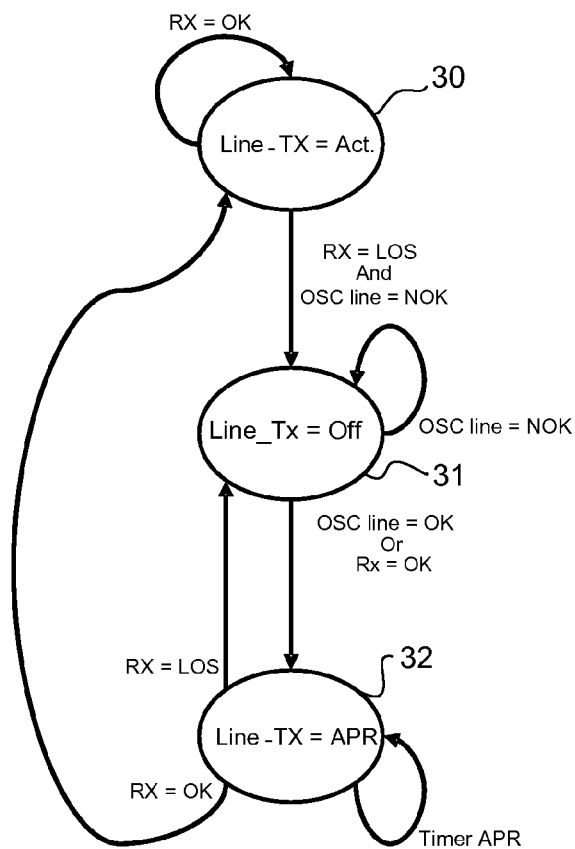
FIG. 1B is a state diagram of the safety operations of the amplifier module.

The amplifier module 13 can implement safety measures, such as the OFC (Open Fiber Control) protocol. FIG. 1B is a state diagram of optical safety protocols for the module 13. The power of outgoing signal is controlled responsive to the power of the incoming signals which are transmitted over the link by the remote node also following OFC protocol. In the "normal" logic state 30, the power of the signals on the Rx line are normal so that the post-amplifier 15 remains operative and the outgoing Tx line is active. The amplifier module 13 remains in that state 30 as long as the Rx line is "okay." But in case of a fiber cut or failure on the Rx line, a loss of signal (Rx=LOS), and OSC is lost. Rather than the network supervisory and management unit 16 which provides the control for the optical network and its constituent elements, such as the amplifier module 13, the amplifier module 13 itselfs shuts down the output of the post-amplifier 15 (the control lines to the amplifier are not shown) by an ALS (Automatic Laser Shutdown) command and the Tx line is "off." This is represented by logic state 31. The control unit of the module 13 is not shown in the drawings. As long as the Rx line is out and there are no OSC signals through the splitter 18, the module 13 remains in state 31 and no optical signals are sent on the Tx line.

When the fiber connectivity is restored, as detected by the return of the OSC signals or the Rx signals to the unit 16, the post-amplifier 15 is switched-on at a reduced output power level, i.e., the APR (Automatic Power Reduction) level. The amplifier module 13 transitions to a logic state 32 and begins APR restart procedures. In this state the optical power launched into the Tx fiber is kept below the hazardous level for a period set by an APR timer and at this point the remote node is reciprocally sending incoming signals on the Rx optical fiber at an APR level. This ensures that the connectivity of the fiber loop of the Tx and Rx optical fibers is fully restored. If the Rx fiber is lost again, Rx=LOS, before the APR timer times out, the module 13 returns to the logic state 31. If nothing happens in the logic state 32 before the APR timer times out, then the module 13 returns to the normal logic state 30.

Figure 2A:
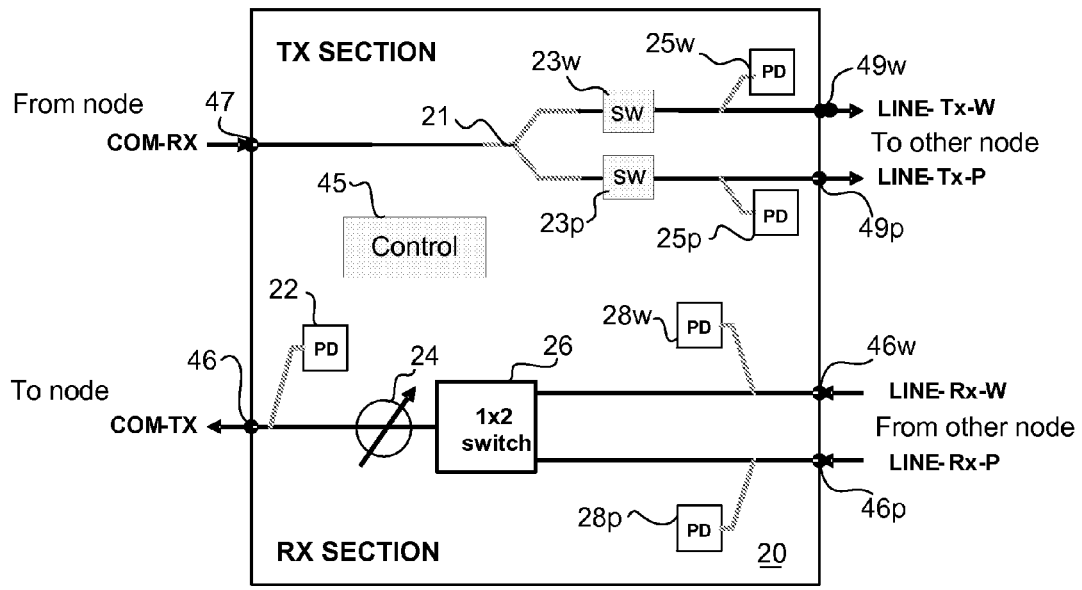
FIG. 2A is a representational diagram of protection module for an optical network node.

For protection measures, redundancy is provided for the optical signals by two alternate fiber paths, i.e., the working fiber and the protection fiber. Currently, protection modules are conventionally deployed in optical networks to implement protection measures. FIG. 2A is a diagram of a conventional protection module for 1+1 protection. The protection module sits as an interface between the network node and the optical fibers which provide the link to another node on the remote of the link. Since the protection is 1+1, there are four fibers in the link, two transmitting fibers, a Tx-W line and Tx-P line, and two receiving fibers, a Rx-W line and Rx-P line. By convention, W stands for working and P stands for protection.

The FIG. 2A protection module 20 has a transmission section which has an input Com-Rx port 47 which receives signals to be transmitted from the network node to the remote node across the link. The signals are split 50-50 by a splitter 21 for the working transmitting fiber Tx-W and for the protection transmitting fiber Tx-P. Before reaching the transmitting ports 49$w$ and 49$p$, the output each set of the split signals is controlled by a switch 23$w$, 23$p$. The effectiveness of each switch 23$w$, 23$p$ is monitored by a corresponding PD (Photo Diode) 25$w$, 25$p$ which receives a small tapped off portion of the signals from the output of the switches 23$w$, 23$p$.

The protection module 20 also has receiving section which has two input ports, 46$w$ for the working receiving fiber Rx-W and 46$p$ for the protection receiving fiber Rx-P. The received signals from the two ports 46$p$ and 46$w$ and the remote node are fed into the input terminals of a 1×2 optical switch 26 which selects whether the signals from the input ports 46$w$ or 46$p$ are to be passed to the output Com-Tx port 46 and the network node. A VOA 24 controls the power of the signals to the output Com-Tx port 46. These signals are monitored by a PD 22 which receives a small tapped off portion of the signals from the output of the VOA 24.

A control unit 45 receives the tapped off monitoring signals from the PDs 22, 25$w$, 25$p$, 28$w$ and 28$p$, and controls the switches 23$w$, 23$p$ and VOA 24. Control lines to and from these components are not shown. Alternatively, the operation of the protection module 20 could be controlled by the network supervisory and management unit 16 communicating over the OSC, but a control unit in the module 20 operates faster and more efficiently.

Figure 2B:
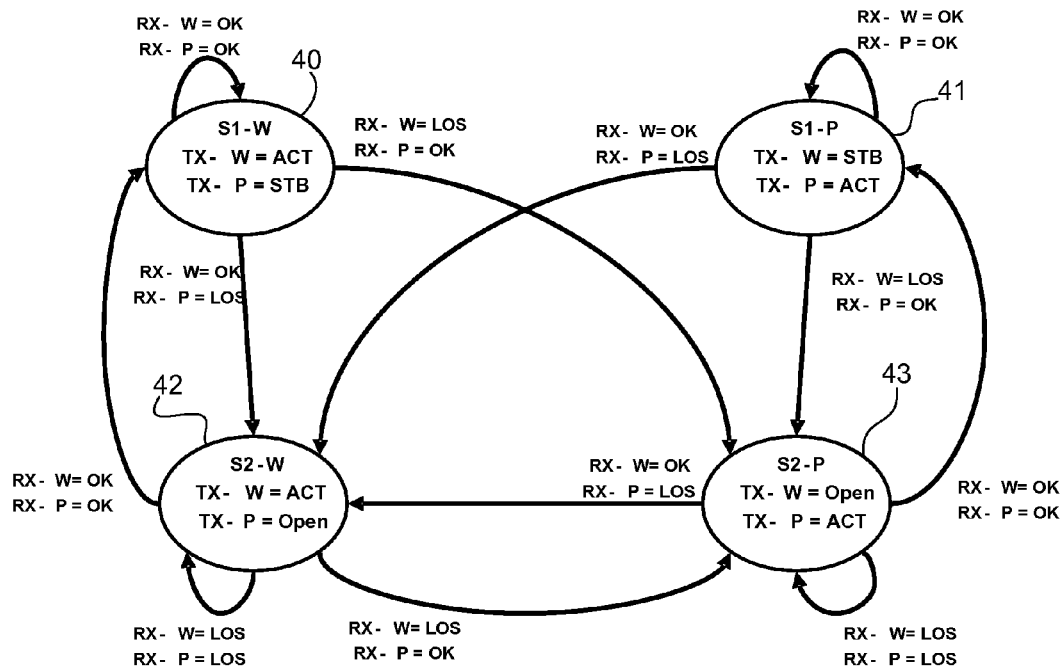
FIG. 2B is a state diagram of the FIG. 2A protection module.

FIG. 2B illustrates the operation of the protection module 20 with a logic state diagram. In a "normal" logic state 40, both receiving lines, Rx-W and Rx-P, are operative and the protection module 20 transmits outgoing signals on both transmitting lines, Tx-W and Tx-P. The switch 26 selects the signals of the receiving RX-W line and forwards them to the network node. By convention, the receiving line selected by the switch 26 is in the Active state (ACT), while the other is the Standby state (STB). Even though the two states, ACT and STB, are related to the receiving fibers, they are also applied to the transmitting fibers, Tx-W and Tx-P, even though even if both lines are transmitting the same optical signals in accordance with 1+1 protection procedures. Thus the transmitting Tx-W line is considered Active and the Tx-P line is Standby.

In case of failure on one Rx line, the absence of optical power, say, LOS (Loss of Signal) on the Rx-P line, then there is a transition from logic state 40 to logic state 42. In this state, the Tx-W line remains Active, but the transmitting Tx-P line corresponding to the receiving Rx-P line is shut down. This is done by the switch 23p and represented by an open command, i.e., a command to open the switch and break the optical circuit. This command corresponds to an ALS (Automatic Laser Shutdown) command. The module 20 remains in the logic state 42 as long as the Rx-P line is in a LOS state and even if the Rx-W line now falls into a LOS state. When both receiving lines, Rx-W and Rx-P, have recovered and are functioning, there is a transition from the logic state 42 back to logic state 40. On the other hand, if the Rx-W line falls into a LOS state and the Rx-P line has recovered, the module 20 transitions from the logic state 42 to the logic state 43 in which the Tx-P is considered Active and the Tx-W line Standby.

The logic state 43 can also be reached from the logic state 40. If the receiving Rx-W line fails, i.e., LOS, while the Rx-P line remains functional, the module 20 transitions from the logic state 40 to the logic state 43. The module 20 remains in the logic state 43 as long as the Rx-W line is in a LOS state and even if the Rx-P line now falls into a LOS state. When both receiving lines, Rx-W and Rx-P, have recovered and are functioning, there is a transition from the logic state 43 to the logic state 41 in which the Tx-P line remains Active and the Tx-W in Standby. As long as the two receiving lines remain functional, the module 20 remains in the logic state 41. Transitions from the logic state 41 occur when the Rx-P is lost (transition to the logic state 42) and when the Rx-W line fails (transition to the logic state 43). This preserves the symmetry of the transitions between the logic states 40-43.

Figure 3:
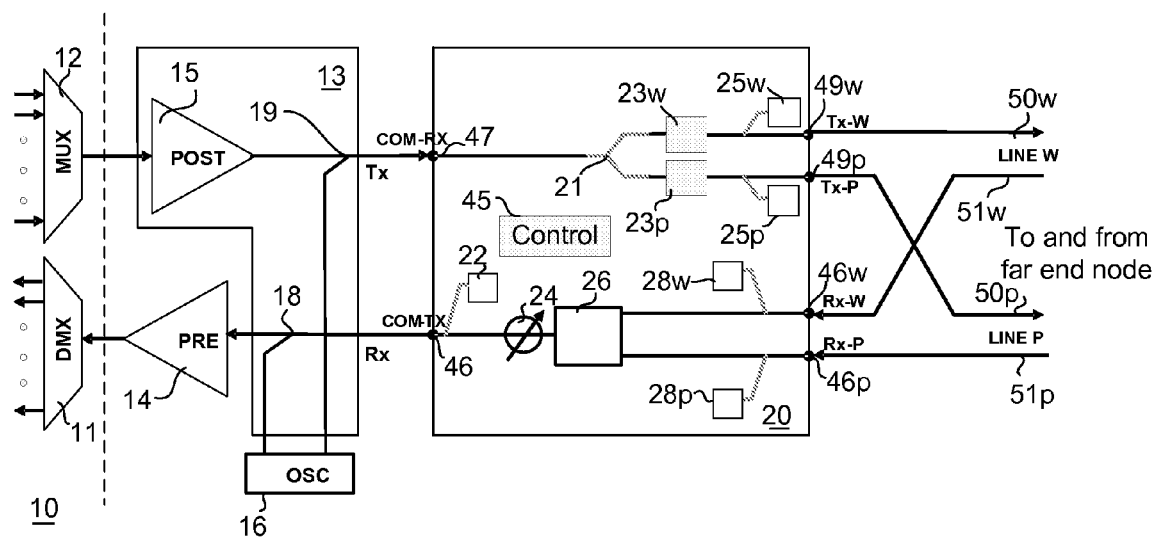
FIG. 3 is a representational diagram of a physical combination of the FIG. 1A amplifier module and the FIG. 2A protection module for an optical network node.

With modules for optical network safety measures, such as the amplifier module 13, and modules for optical network protection measures, such as the protection module 20, a combination of such modules can presumably be installed to obtain the benefits of such measures. FIG. 3 shows the combination of the two modules 13 and 20 from FIGS. 1A and 2A respectively. The same reference numerals from the earlier drawings are used for ease of understanding. As shown in FIG. 3, working and protection lines are paired into loops so that the link to the remote node (not shown) is formed by a first fiber loop, transmitting working optical fiber 50w and receiving working optical fiber 51w, and a second fiber loop, transmitting protection optical fiber 50p and receiving protection optical fiber 51p. The Com-Rx input port 47 of the protection module 20 is fed directly by the post-amplifier 15 of the module 13. The power levels of both outputs, the output port 49w for Tx-W line, and the output port 49p for the Tx-P line, should satisfy optical safety measures, such as the OFC protocol. The Com-Tx output port 46 of the protection module 20 feeds the input of the pre-amplifier 14. This configuration provides protection for the line path (link fibers and possible intermediate amplifiers sites) but no protection is provided for the two end nodes, viz., the node 10 and its remote node.

But there are problems with the separate implementation of optical safety measures in the module 13 and the protection measures in the module 20. For example, if one assumes that the transmitting Tx-W line 50w is in the active (ACT) state, the switch 26 passes the signals on the receiving Rx-W line 51w, which is correspondingly active, to the amplifier module 13. If the received signals are lost, Rx-W=LOS, the optical safety protocol shuts down the POST amplifier 15. Even though the protection module 20 has responded to the LOS state on the Tx-W line 50w and made the transmitting protection Tx-P line 50p active, it is also turned off since the POST amplifier 15 which drives both transmitting lines 50w and 50p and is now off.

Furthermore, with the Tx-P line 50p now considered active, the switch 26 of the protection module 20 passes signals from the corresponding receiving Rx-P line 51p to the amplifier module 13. Thus the module 13 is not monitoring the working Rx-W line 51w to determine its return to operating condition; the correct line restart cannot be performed for the corresponding transmitting Tx-W line 50w. The APR procedures cannot be performed.

Figure 4:
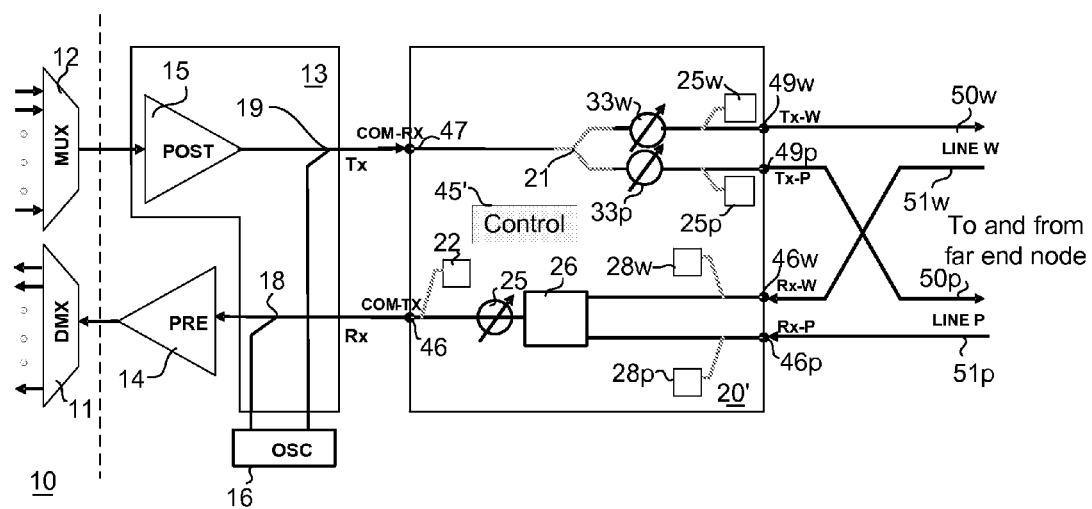
FIG. 4 is a representational diagram of a combination of the FIG. 1A amplifier module and a protection module according to one embodiment of the present invention.

To avoid these problems, the present invention provides for the close interoperation of safety measures with protection measures. The protection module 20 is modified so that the switches 23w, 23p are replaced by VOAs 33w, 33p and the module's operations are changed with a control unit 45'. The modified protection module is labeled 20' with the same elements as the module 20 except the switches 23w, 23p and the control unit 45'. The connections of the amplifier module 13 and protection module 20' are shown in FIG. 4 and unchanged from those of FIG. 3 in this embodiment of the present invention. Safety and protection measures are installed in the protection module 20'. Besides being able to control the output power of the signals leaving the transmitting ports 49w and 49p independently, the variable optical attenuators 33w and 33p are used to control the amplifier output in accordance with safety procedures. In the following description the AVS (Automatic VOA Shutdown) command/status for the module 20' corresponds to as ALS (Automatic Laser Shutdown) command/status used for the amplifier module 13.

Figure 5:
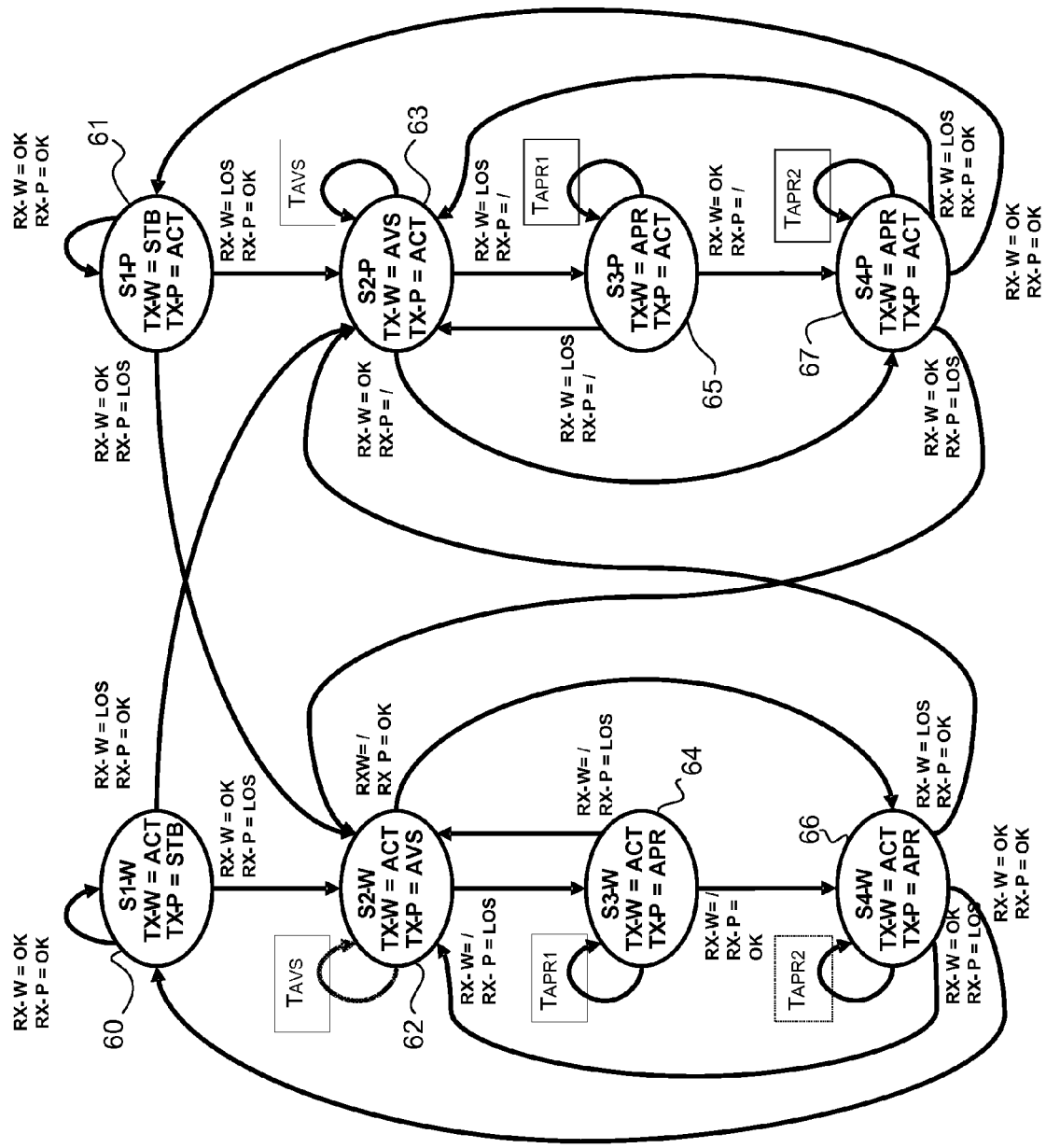
FIG. 5 is a logic state diagram for the protection module in the FIG. 4 combination for safety and protection operations which avoids the deficiencies of a straightforward combination of modules, in accordance to one embodiment of the present invention.

The protection module 20' operates according to the logic state diagram of FIG. 5. Starting with the S1-W logic state 60, both receiving lines, Rx-W line 51w and Rx-P line 51p, have power levels above their thresholds (i.e. both fiber loops, working and protection, are OK). Since the S1-W logic state 60 (TX-W=ACT and TX-P=STB) is symmetric with the S1-P 61 logic state (TX-W=STB and TX-P=ACT) and the descending branches of logic states, logic states 62, 64 and 66 from logic state 60 and logic states 63, 65 and 67 from logic state 61, only one branch is described in full detail.

Starting with logic state 60, the S1-W logic state 60 transitions to the S2-W logic state 62 upon a failure on the receiving Rx-P line 51p (Rx-P=LOS). The output of the transmitting Tx-P line 50p is turned off (Tx-P=AVS) following safety procedures. If, on the other hand, there is a failure of the receiving Rx-W line 51w, the logic state 60 transitions to the S2-P logic state 63 in which protection switching is performed. The protection transmitting Tx-P line 50p become active (Tx-P=ACT) and the optical safety procedures are started by shutting down the working transmitting Tx-W line 50w (Tx-W=AVS).

Returning to the S2-W logic state 62, the state is a "timed" state where the transmitting Tx-P line 50p is kept in AVS for a time TAVS whatever the conditions detected on the receiving Rx lines 51w, 51p are. Only after the timer for TAVS has timed out is the receiving Rx-P line 51p checked. If the receiving Rx-P line 51p still fails (Rx-P=LOS), a re-start procedure is attempted by a transition to the S3-W logic state 64. On the other hand, if the receiving Rx-P line 51p is operative (Rx-P=OK), the receiving protection line 51p is already restored (and a re-start procedure has been already started by the remote site), the logic state 62 transitions to the S4-W logic state 66. It should be noted that in S2-W logic state 62, the receiving Rx-W line 51w is not checked. Any failure on the Rx-W line 51w at this stage does not trigger anything because the logic state 62 is directed toward about the failure of the Rx-P line 51p.

The S3-W logic state 64 is also "timed" state where the module 20 is attempting a re-start procedure on the transmitting Tx-P line 50p (TX-P=APR). The transmitting line 50p is pulsed with its power kept below the hazardous level by APR procedures. This state is maintained for a time $T_{APR1}$ to allow the remote node to detect the re-start procedure. After the timer $T_{APR1}$ times out, there are two possibilities. If the receiving Rx-P line 51p remains non-operative (Rx-p=LOS), the re-start procedure fails and there is a transition back to the S2-W logic state (where TX-P=AVS). Alternatively, if the receiving Rx-P line 51p becomes operative (Rx-P=OK) and the protection loop is restored, the re-start procedure is proceeding successfully. There is a transition to the S4-W logic state 66 where the re-start is confirmed.

The S4-W logic state 66 is another "timed" state where a timer for a period $T_{APR2}<T_{APR1}$ is used to confirm that the re-start procedure is successful. This is needed to avoid bouncing between APR and AVS power levels when the re-start procedure is started at the same time by the protection units 20 at the subject node, node 10, and the remote node of the link. In the logic state 66 the Tx-P line 50p is still in APR. At the end of $T_{APR2}$ if the receiving Rx-P line 51p is still operative (Rx-P=OK), the line 51p is fully powered and operative, i.e., there is a transition to the S1-W logic state 60 where Tx-P=STB). If, on the other hand, the receiving Rx-P line 51p is not operative (Rx-P=LOS) and the re-start procedure has not succeeded, the line 50p is set to AVS again (S2-W logic state 62). In case of a failure detected on the receiving Rx-W line 51w (Rx-W=LOS), there is a transition to the S2-P logic state 63 where protection switching is performed. The protection transmitting Tx-P line 50p becomes active (Tx-P=ACT) and the working transmitting Tx-W line 50w is shut down (Tx-W=AVS). This starts the optical safety procedure for the working line. In the S4-W logic state 66, the transmitting Tx-P line 50p is considered "almost ready," so that protection switching can be performed, viz, transitioning to the S2-P logic state 63, even if the timer $T_{APR2}$ has not yet expired.

From the symmetry of the logic state branches, it is easy to see that the logic states 61, 63, 65 and 67 correspond to the described logic states 60, 62, 64 and 66, except that the earlier branch of states deal principally with the protection transmitting Tx-P 50p being active and a failure on the receiving Rx=W line 51w (Rx-W=LOS).

Figure 6:
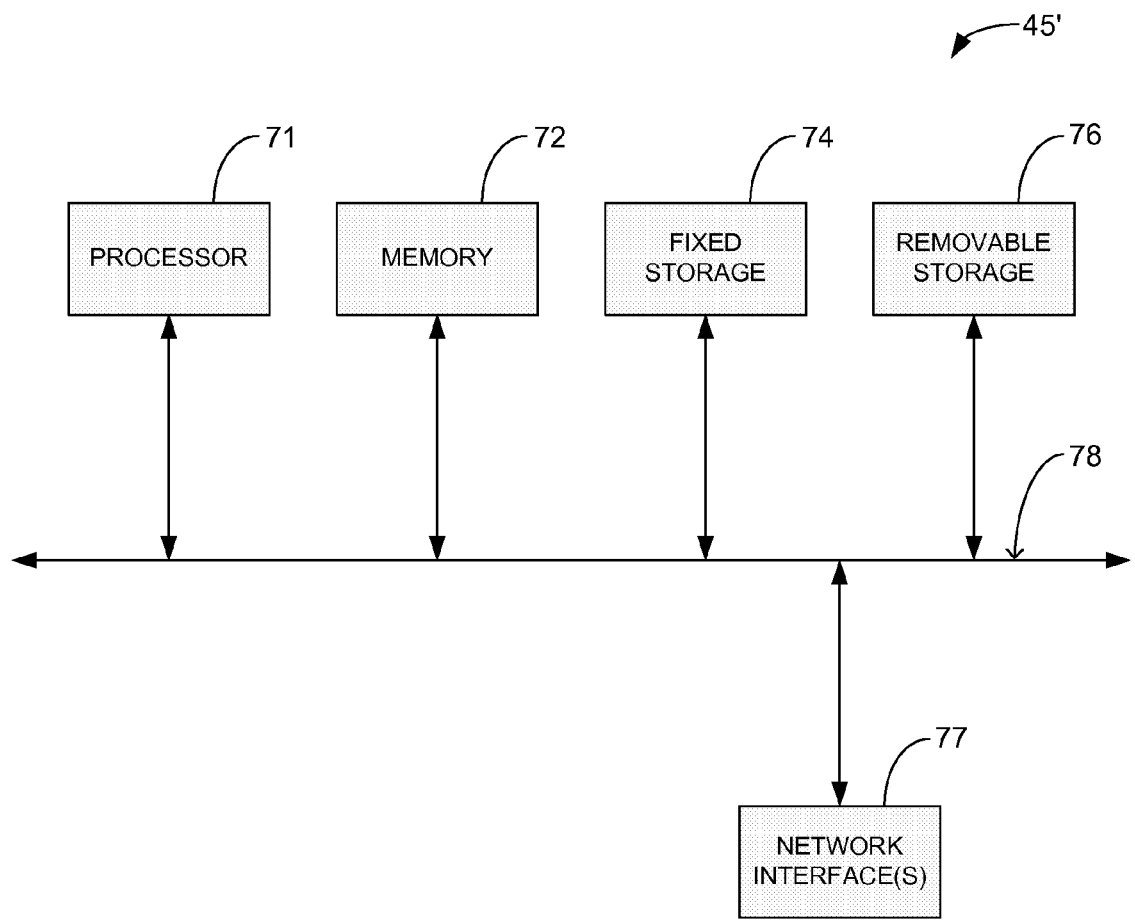
FIG. 6 is a representational diagram of the control unit of the protection module of FIG. 4.

The components of the control unit 45' for the protection module 20 are shown in FIG. 6. The control unit 45' includes a memory subsystem 72 which can store and retrieve software programs incorporating computer code that implements aspects of the present invention, data for use with the invention and the like, and a central processor subsystem 71 which, among other functions, processes the instructions and data of the computer code. Example computer readable storage media for the memory 72 include semiconductor system memory and flash memory preferably, though other storage media, such as hard drive, CD-ROM, floppy disk, and tape, might be used. The control unit 45 might further include subsystems, such as fixed storage 74 (e.g., hard drive), removable storage 76 (e.g., CD-ROM drive), and one or more network interfaces 77, all connected by a system bus 78. The network interface 77 provides a pathway for the node to communicate with the network management system, i.e., the network supervisory and management unit 16, and other nodes to synchronize operations. Additional or fewer subsystems in the control block may be used. For example, the control unit may include more than one processor 71 (i.e., a multi-processor system), or a cache memory.

As described, the present invention receives the benefits of a conventional installation of power amplifier modules 13 and protection modules 20' with only a minimum of modifications and existing arrangements. The memory 72 of the control unit 45' is loaded with the computer code to carry out the operations described above and the network supervisory and management unit 16 is shut off from the safety measures. Of course, if more integration in the modules is desirable, the post amplifier 15 and possibly the pre-amplifier 14 can be combined with the protection module.

With the present invention, optical safety on both lines is integrated with the protection switching state machine to guarantee the optical power level reduction when the fiber interruption is detected and also the correct line restart when the fiber loop is restored. The optical power level remains below the hazard level at any point of the optical network which might be accessible to the network operator or service personnel.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of operating an interface between a network node and an optical fiber link to a remote node at an opposite end of said link, said link having first and second optical fiber loops, each optical fiber loop having a transmitting optical fiber and a receiving optical fiber, said method comprising:
   transmitting signals from said node through transmitting optical fibers of both of said first and second optical fiber loops;
   receiving signals for said node through one of said receiving optical fibers of said first and second optical fiber loops;
   monitoring receiving optical fibers of both of said first and second optical fiber loops;
   detecting a fault on one of said receiving optical fibers of said first and second optical fiber loops;
   switching off a transmitting optical fiber of said optical fiber loop to which said fault-detected receiving optical fiber belongs;

maintaining reception of signals for said node through said one of said receiving optical fibers of said first and second optical fiber loops if said fault-detected receiving optical fiber is the other receiving optical fiber of said first and second optical fiber loops, or switching reception of signals for said node through said other receiving optical fiber of said first and second optical fiber loops if said fault-detected receiving optical fiber is said one receiving optical fiber of said first and second optical fiber loops; and maintaining transmission of signals from said node through a transmitting optical fiber of an optical fiber loop to which said fault-detected receiving optical fiber does not belong;

whereby said interface performs both protection and safety measures for said network node.

2. The method of claim 1 further comprising:

re-starting said switched-off transmitting optical fiber with APR (Automatic Power Reduction) procedures after a first predetermined amount of time; and monitoring said fault-detected receiving optical fiber for a return of operation for a second predetermined amount of time.

3. The method of claim 2 further comprising terminating re-starting step on said switched-off transmitting optical fiber if said fault-detected receiving optical fiber does not return to operation after said second predetermined amount of time; or continuing re-starting step on said switched-off transmitting optical fiber for a third predetermined amount of time if said fault-detected receiving optical fiber becomes operative.

4. The method of claim 3 wherein said third predetermined amount of time is shorter than said second predetermined amount of time.

5. The method of claim 3 further comprising:

upon return to full operation of said fault-detected receiving optical fiber, transmitting signals from said node through said transmitting optical fibers of both of said first and second optical fiber loops.

6. The method of claim 1 wherein at least one VOA (Variable Optical Attenuator) in said interface is engaged in said terminating and said re-starting steps to control strength of signals transmitted through said switched-off transmitting optical fiber.

7. The method of claim 1 wherein at least two photodiodes in said interface are engaged in said monitoring steps.

8. The method of claim 1 wherein said interface has an amplifier module interposed between said network node and said interface, said amplifier module having safety measures for turning off an amplifier in said module, said method further comprising disengaging said safety measures in said amplifier module so that only said interface performs safety measures for said node.

9. An interface between a network node and an optical fiber link to a remote node at an opposite end of said link, said link having a first and second optical fiber loops, each optical fiber loop having a transmitting optical fiber and a receiving optical fiber, said interface comprising:

means for transmitting signals from said node through transmitting optical fibers of both of said first and second optical fiber loops;

means for receiving signals for said node through one of said receiving optical fibers of said first and second optical fiber loops;

means for monitoring receiving optical fibers of both of said first and second optical fiber loops;

means for detecting a fault on one of said receiving optical fibers of said first and second optical fiber loops;

means for switching off a transmitting optical fiber of said optical fiber loop to which said fault-detected receiving optical fiber belongs;

means for maintaining reception of signals for said node through said one of said receiving optical fibers of said first and second optical fiber loops if said fault-detected receiving optical fiber is the other receiving optical fiber of said first and second optical fiber loops, or switching reception of signals for said node through said other receiving optical fiber of said first and second optical fiber loops if said fault-detected receiving optical fiber is said one receiving optical fiber of said first and second optical fiber loops; and means for maintaining transmission of signals from said node through a transmitting optical fiber of an optical fiber loop to which said fault-detected receiving optical fiber does not belong;

whereby said interface performs both protection and safety measures for said network node.

10. The interface of claim 9, further comprising:

means re-starting said switched-off transmitting optical fiber with APR (Automatic Power Reduction) procedures after a first predetermined amount of time; and means for monitoring said fault-detected receiving optical fiber for a return of operation for a second predetermined amount of time.

11. The interface of claim 10, wherein the means for re-starting is configured to terminate re-starting of said switched-off transmitting optical fiber if said fault-detected receiving optical fiber does not return to operation after said second predetermined amount of time, or continues re-starting of said switched-off transmitting optical fiber for a third predetermined amount of time if said fault-detected receiving optical fiber becomes operative.

12. The interface of claim 11, wherein said third predetermined amount of time is shorter than said second predetermined amount of time.

13. The interface of claim 11, wherein upon return to full operation of said fault-detected receiving optical fiber, said means for maintaining transmission of signals from said node through said transmitting optical fibers of both of said first and second optical fiber loops.

14. The interface of claim 11, further comprising at least one VOA (Variable Optical Attenuator) to control strength of signals transmitted through said switched-off transmitting optical fiber.

15. The interface of claim 11, wherein said means for monitoring comprises at least two photodiodes.

16. The interface of claim 9, further comprising an amplifier module interposed between said network node and said interface, said amplifier module having safety measures capabilities to turn off an amplifier in said amplifier module, and means for disengaging said safety measures in said amplifier module so that only said interface performs safety measures for said node.

17. An apparatus comprising:

a network node output port configured to transmit signals from a node through transmitting optical fibers of both of first and second optical fiber loops;

a network node input port configured to receive signals for said node through receiving optical fibers of one of said first and second optical fiber loops;

at least one photodiode arranged to monitor receiving optical fibers of each of said first and second optical fiber loops;

a controller coupled to the photodiode and configured to:

detect a fault on one of said receiving optical fibers of said first and second optical fiber loops based on output of the at least one photodiode;

switch off a transmitting optical fiber of the optical fiber loop to which said fault-detected receiving optical fiber belongs;

maintain reception of signals for said node through said one of said receiving optical fibers of said first and second optical fiber loops if said fault-detected receiving optical fiber is the other receiving optical fiber of said first and second optical fiber loops, or switch reception of signals for said node through said other receiving optical fiber of said first and second optical fiber loops if said fault-detected receiving optical fiber is said one receiving optical fiber of said first and second optical fiber loops; and maintain transmission of signals from said node through a transmitting optical fiber of an optical fiber loop to which said fault-detected receiving optical fiber does not belong, thereby performing both protection and safety measures for said network node.

18. The apparatus of claim 17, wherein the controller is configured to:

re-start said switched-off transmitting optical fiber with APR (Automatic Power Reduction) procedures after a first predetermined amount of time; and monitor said fault-detected receiving optical fiber for a return of operation for a second predetermined amount of time.

19. The apparatus of claim 18, wherein the controller is configured to terminate re-starting of said switched-off transmitting optical fiber if said fault-detected receiving optical fiber does not return to operation after said second predetermined amount of time, or continue re-starting of said switched-off transmitting optical fiber for a third predetermined amount of time if said fault-detected receiving optical fiber becomes operative.

20. The apparatus of claim 18, wherein the controller is configured to, upon return to full operation of said fault-detected receiving optical fiber, maintain transmission of signals from said node through said transmitting optical fibers of both of said first and second optical fiber loops.

21. The apparatus of claim 17, further comprising an amplifier module interposed between said network node and said apparatus, said amplifier module having safety measures capabilities to turn off an amplifier in said amplifier module, and wherein the controller is further configured to disengage said safety measures in said amplifier module so that only said apparatus performs safety measures for said node.

* * * * *